US008713202B2

(12) United States Patent
Droux et al.

(10) Patent No.: US 8,713,202 B2
(45) Date of Patent: Apr. 29, 2014

(54) METHOD AND SYSTEM FOR NETWORK CONFIGURATION FOR VIRTUAL MACHINES

(75) Inventors: Nicolas G. Droux, Rio Rancho, NM (US); Kais Belgaied, Sunnyvale, CA (US); Erik Nordmark, Mountain View, CA (US); Sunay Tripathi, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1566 days.

(21) Appl. No.: 11/489,923

(22) Filed: Jul. 20, 2006

(65) Prior Publication Data
US 2008/0043756 A1 Feb. 21, 2008

(51) Int. Cl.
*G06F 15/16* (2006.01)
*G06F 15/177* (2006.01)
*G06F 15/173* (2006.01)

(52) U.S. Cl.
USPC ............................ 709/250; 709/225; 709/220

(58) Field of Classification Search
USPC ............. 709/250, 220, 225; 726/13; 370/392, 370/420; 714/4
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,177,311 B1 | 2/2007 | Hussain et al. | |
| 7,246,174 B2 * | 7/2007 | Sciandra et al. | .............. 709/244 |
| 7,260,102 B2 | 8/2007 | Mehrvar et al. | |
| 7,313,142 B2 | 12/2007 | Matsuo et al. | |
| 2003/0037154 A1 | 2/2003 | Poggio et al. | |
| 2004/0267866 A1 | 12/2004 | Carollo et al. | |
| 2005/0111455 A1 | 5/2005 | Nozue et al. | |
| 2005/0135243 A1 | 6/2005 | Lee et al. | |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner* — Asad Nawaz
*Assistant Examiner* — Stephanie Chang
(74) *Attorney, Agent, or Firm* — Osha Liang LLP

(57) ABSTRACT

A method for changing network configuration parameters that includes generating a request to change a network configuration parameter, where the request is generated by a virtual machine, sending the request to a virtual network interface card (VNIC) associated with the virtual machine, sending the request to a VNIC configuration database associated with the VNIC, determining whether the virtual machine is allowed to change the network configuration parameter, if the virtual machine is allowed to change the network configuration parameter, updating the VNIC configuration database and VNIC to reflect the change in the network configuration parameter, and notifying the virtual machine that the change in network configuration parameter is allowed, and if the virtual machine is not allowed to change the network configuration parameter, dropping the request.

19 Claims, 6 Drawing Sheets

(56) References Cited

U.S. PATENT DOCUMENTS

| | | |
|---|---|---|
| 2005/0138620 A1 | 6/2005 | Lewites |
| 2006/0041667 A1 | 2/2006 | Ahn et al. |
| 2006/0045089 A1* | 3/2006 | Bacher et al. ............... 370/392 |
| 2006/0070066 A1 | 3/2006 | Grobman |
| 2006/0174324 A1 | 8/2006 | Zur et al. |
| 2006/0206300 A1* | 9/2006 | Garg et al. ............... 703/27 |
| 2007/0101323 A1* | 5/2007 | Foley et al. ............... 718/1 |

OTHER PUBLICATIONS

Dovrolis, C., Thayer, B. and Ramanathan, P: "HIP: Hybrid Interrupt—Polling for the Network Interface", ACM SIGOPS Operating Systems Review, vol. 35, Iss. 4, Oct. 2001, (11 Pages).

* cited by examiner

METHOD AND SYSTEM FOR NETWORK CONFIGURATION FOR VIRTUAL MACHINES

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Method and System for Network Configuration for Containers" with U.S. application Ser. No. 11/490,479; "Network Memory Pools for Packet Destinations and Virtual Machines" with U.S. application Ser. No. 11/490,486; "Multiple Virtual Network Stack Instances" with U.S. application Ser. No. 11/489,929; and "Shared and Separate Network Stack Instances" with U.S. application Ser. No. 11/489,933.

BACKGROUND

Network traffic is transmitted over a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue.

In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for changing network configuration parameters. The method comprises generating a request to change a network configuration parameter, wherein the request is generated by a virtual machine, sending the request to a virtual network interface card (VNIC) associated with the virtual machine, sending the request to a VNIC configuration database associated with the VNIC, determining whether the virtual machine is allowed to change the network configuration parameter, if the virtual machine is allowed to change the network configuration parameter, updating the VNIC configuration database and VNIC to reflect the change in the network configuration parameter, and notifying the virtual machine that the change in network configuration parameter is allowed, and if the virtual machine is not allowed to change the network configuration parameter, dropping the request.

In general, in one aspect, the invention relates to a method for changing network configuration parameters. The method comprises generating a request to change a network configuration parameter associated with a virtual machine, wherein the request is generated by a host and the virtual machine is executing on the host, sending the request to a VNIC configuration database associated with the VNIC, updating the VNIC configuration database and VNIC to reflect the change in the network configuration parameter, and notifying the virtual machine that the network configuration parameter has changed.

In general, in one aspect, the invention relates to a host. The host comprises a virtual machine configured to generate a first request to change a first network configuration parameter associated with the virtual machine, and send the first request to a virtual network interface card (VNIC), the VNIC, operatively connected to the virtual machine, configured to receive the first request from the virtual machine, and send the first request to a VNIC configuration database, the VNIC configuration database, operatively connected to the VNIC, configured to receive the first request, determine whether the virtual machine is allowed to change the first network configuration parameter, if the virtual machine is allowed to change the first network configuration parameter, update the VNIC configuration database and VNIC to reflect the change in the first network configuration parameter, and notify the virtual machine that the requested change in the first network configuration parameter is allowed, and if the virtual machine is not allowed to change the first network configuration parameter, drop the first request.

Other aspects of the invention will be apparent from the following description and the appended claims.

DETAILED DESCRIPTION

Figure 1:
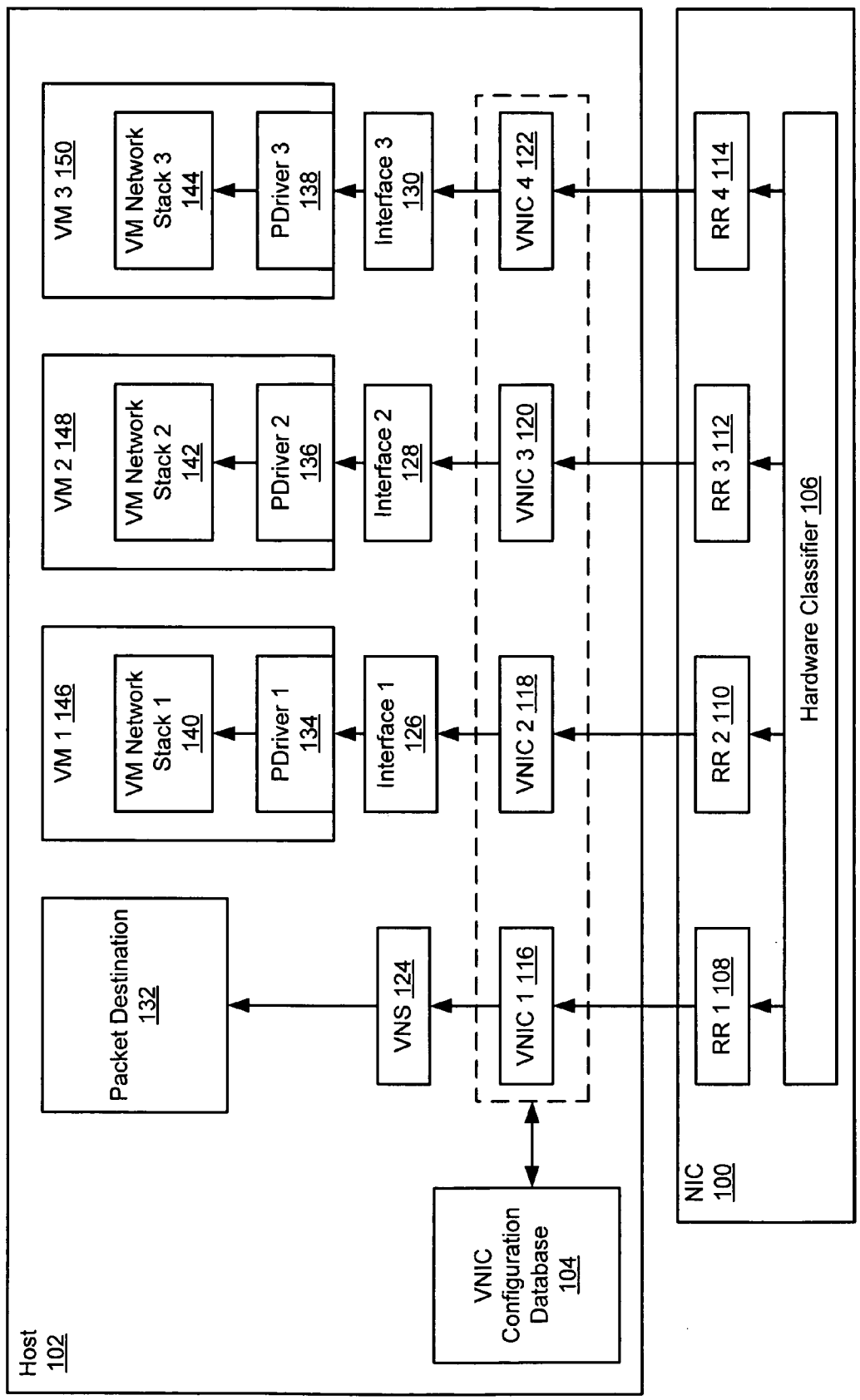
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for changing network configuration parameters. Further, embodiments of the invention provide a method and system for limiting the network configuration parameters a virtual machine may change. In addition, embodiments of the invention provide a method and system for monitoring outbound packets from a virtual machine to ensure that the virtual machine has not changed a network configuration parameter that is not authorized to change.

In one embodiment of the invention, a network configuration parameter corresponds to any parameter that is associated with networking. Examples, of network configuration parameters may include, but are not limited to, Media Access Control (MAC) address, Internet Protocol (IP) address, IP routing algorithm (e.g., Routing Information Protocol (RIP), Open Shortest Path First (OSPF), etc.), transport layer protocol (e.g., Transmission Control Protocol (TCP), User Datagram Protocol (UDP), default route (i.e., the route, set in the IP routing table, used when no other entry in the IP routing table matches the destination IP address of the packet), TCP parameters (i.e., parameters in the TCP that may be changed, for example, bandwidth-delay product, buffer size, etc.), IP parameters (i.e., parameters in the IP that may be changed), and TCP port number.

FIG. 1 shows a system in accordance with one embodiment of the invention. The system shown in FIG. 1 includes a host (102) and a network interface card (NIC) (100). The NIC (100) includes a hardware classifier (106) and a number of receive rings (RRs) (108, 110, 112, 114). The NIC (100) is configured to send and receive packets. The hardware classifier (106) is configured to classify incoming packets (i.e. packets received by the NIC (100) from the network (not shown) (e.g., the Internet, a wide area network (WAN), a local area network (LAN), etc.). The hardware classifier (106) classifies a packet based on information in the header of the packet. Accordingly, the hardware classifier (106) may classify the packet based on one or a combination of the following: the source internet protocol (IP) address, the destination IP address, a source Media Access Control (MAC) address, a destination MAC address, a source port, a destination port, a protocol type (e.g., Transmission Control Protocol (TCP), User Datagram Protocol (UDP), etc.) The hardware classifier (106) is not limited to classifying a packet based on one of the aforementioned parameters.

Continuing with the discussion of FIG. 1, once a packet has been classified, the packet is forwarded to the appropriate RR (108, 110, 112, 114). Typically, each RR (108, 110, 112, 114) is configured to receive packets for a specific virtual machine (146, 148, 150) or a particular packet destination (132). In one embodiment of the invention, each RR (108, 110, 112, 114) corresponds to a buffer in the NIC (100), which is configured to store a finite number of packets.

The host (102) includes a device driver (not shown), a number of virtual network interface cards (VNICs) (116, 118, 120, 122), one or more virtual network stacks (VNSs) (124), one or more interfaces (126, 128, 130), one or more packet destinations (132), one or more virtual machines (VMs) (146, 148, 150), and a VNIC configuration database (104). Each of the aforementioned components is described below.

Though not shown in FIG. 1, the device driver is configured to expose the NIC (100) to the host (102). Further, the device driver is configured to expose the individual RRs (108, 110, 112, 114) to the host (102). Exposing the aforementioned components to the host (102) includes providing application programming interfaces (APIs) to allow the host (102) (or components executing therein) to interact with the NIC (100) and the RRs (108, 110, 112, 114) on the NIC (100). Interacting with the NIC (100) typically includes obtaining packets from the NIC (100) and sending packets to the NIC (100).

Each VNIC (116, 118, 120, 122) in the host (102) includes the same functionality as the NIC (100). However, unlike the NIC (100), the VNICs (116, 118, 120, 122) are implemented in the host (100), typically, in a MAC layer of the host (102). To all components above the VNIC (116, 118, 120, 122) (e.g., the VNS (124), the interfaces (126, 128, 130), the packet destination (132), and the VMs (146, 148, 150), the VNICs (116, 118, 120, 122) appear as physical NICs.

Each VNIC (116, 118, 120, 122) is associated with a MAC address and an IP address. Further, each VNIC (116, 118, 120, 122) may be optionally associated with a TCP port. Further, each VNIC (116, 118, 120, 122) is associated with a RR (108, 110, 112, 114) such that the VNICs (116, 118, 120, 122) obtain packets from the RR (108, 110, 112, 114) with which they are associated. For example, VNIC 1 (116) obtains packets from RR 1 (108).

As discussed above, each VNIC (116, 118, 120, 122) may be associated with a VNS (116) or an interface (126, 128, 130). The VNS is described in FIG. 2 below. In one embodiment of the invention, each interface (126, 128, 130) is interposed between a VNIC (116, 118, 120, 122) and a VM (146, 148, 150). Each interface (126, 128, 130) is configured to receive a packet from an associated VNIC (116, 118, 120, 122) and process the packet as required to place it in the address space of the VM (146, 148, 150) with which the interface (126, 128, 130) is associated. In one embodiment of the invention, processing the packet involves flipping the packet (i.e., the bits that make up the packet are flipped such that the most significant bit becomes the least significant bit and vise versa). The result of flipping the packet is that the packet is placed in the address space of the corresponding virtual machine (146, 148, 150). As a result of placing the packet in the address space of the VM (146, 148, 150), the VM (146, 148, 150) is now aware of the packet and can proceed to process the packet.

In one embodiment of the invention, the packet destination (132) corresponds to a process executing in the host (102), where the process is configured to send and receive packets but does not include its own internal networking stack. Rather, the packet destination (132) uses the VNS (124) executing in the host (102). Examples of packet destinations include services (i.e., applications executing in the host (102)) and containers. In one embodiment of the invention, a container corresponds to an isolated execution environment within the host (102), where the container and the host (102) share a common kernel but the processes executing in the container are restricted to execute in the container and have limited access to resources not assigned to the container. An example of a container is a Solaris™ Container. (Solaris is a trademark of Sun Microsystems, Inc. of California, USA).

In one embodiment of the invention, a VM (146, 148, 150) corresponds to an isolated execution environment executing on the host (102). However, unlike packet destinations (132), the VMs (146, 148, 150) do not share the same kernel as the host (102). Rather, each VM (146, 148, 150) executes its own operating system (OS), which may be different from the OS executing on the host. Accordingly, each VM (146, 148, 150) is executing on its own separate kernel.

In addition, each VM (146, 148, 150) includes a pseudo-driver (PDriver) (134, 136, 138) and its own VM network stack (140, 142, 144). The PDriver (134, 136, 138) corresponds to a component in the VM (146, 148, 150) that is configured to interact with the interface (126, 128, 130) associated with the VM (146, 148, 150). The PDriver (134, 136, 138) emulates a device driver (discussed above) (not shown) for the particular VM (146, 148, 150). Accordingly, to the VM network stack (140, 142, 144) in the VM (146, 148, 150), the PDriver (134, 136, 138) corresponds to a real device driver, which is connected to a physical NIC.

The PDriver (134, 136, 138) also maintains the MAC address and the IP address associated with the VM (140, 142, 144). In one embodiment of the invention, the MAC address and IP address maintained by the PDriver (134, 136, 138) is the same as the MAC address and IP address associated with the corresponding VNIC (116, 118, 120, 122). For example, VNIC 4 (122) is associated with the same MAC address and IP address as PDriver 3 (138).

In one embodiment of the invention, each VM network stack (140, 142, 144) includes functionality to process inbound (i.e., packets received by the VM) and outbound packets (i.e., packet issued by the VM (or a process executing therein). The aforementioned functionality to process packets may include but is not limited to IP layer processing and transport layer processing. IP layer processing corresponds to processing the packets in accordance with IP and transport layer processing corresponds to processing packets in accordance with a transport layer protocol such as Transmission Control Protocol (TCP), User Datagram Protocol (UDP), etc.

In one embodiment of the invention, the VNIC configuration database (104) is configured to maintain all network configuration parameters associated with the networking components in the host (102). Accordingly, the VNIC configuration database (104) may include network configuration parameters for each packet destination (132), each VM (146, 148, 150), and each VNIC (116, 118, 120, 122). Further, the VNIC configuration database (104) also includes a listing of which network configuration parameters each VM (146, 148, 150) and/or each packet destination (132) is allowed to change. In addition to listing the network configuration parameters, the VM (146, 148, 150) may change, the VNIC configuration database (104) may also indicate the allowable values the VM (146, 148, 150) or packet destination (132) may change a given network configuration parameter to. For example, the VNIC configuration database (104) may allow VM 1 (146) to change its IP address, but the VNIC configuration database (104) may include a list of IP addresses that the VM 1 (146) may change its IP address to. Accordingly, VM 1 (146) is only allowed to change its IP address to one of the IP addresses in the aforementioned list. Finally, as shown in FIG. 1, the VNIC configuration database (104) is configured to receive requests to change network configuration parameters from the VMs (146, 148, 150) via the associated VNICs (116, 118, 120, 122).

Figure 2:
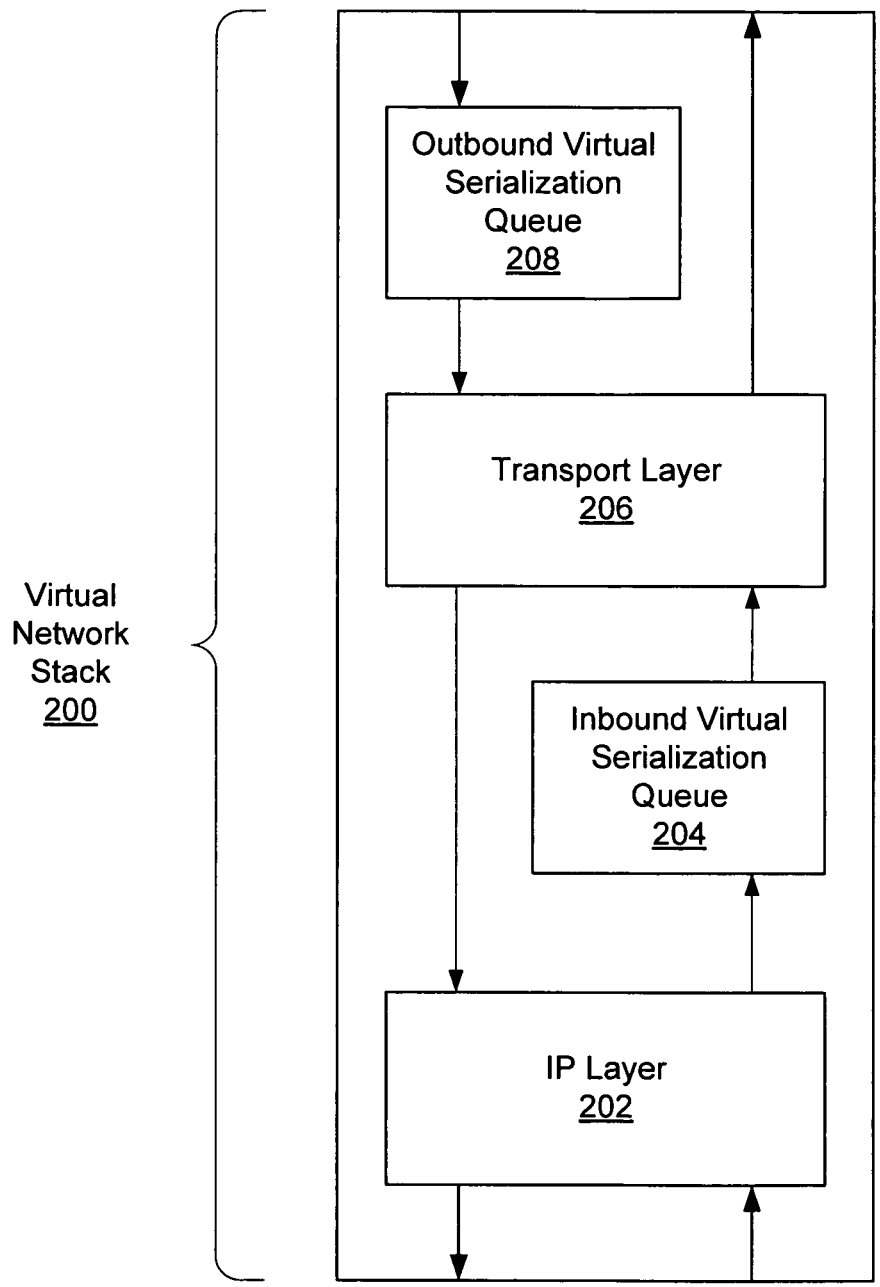
FIG. 2 shows a virtual network stack in accordance with one embodiment of the invention.

FIG. 2 shows a virtual network stack (VNS) in accordance with one embodiment of the invention. In one embodiment of the invention, the VNS (200) includes an Internet Protocol (IP) layer (202), an inbound virtual serialization queue (VSQ) (204), a transport layer (206), and an outbound virtual serialization queue (VSQ) (208). Each of the aforementioned components is discussed below.

In one embodiment, the IP layer (202) is configured to receive packets from the VNIC associated with the VNS (204) (e.g., VNS (124) receives packets from VNIC 1 (116) in FIG. 1). Further, the IP layer (202) is configured to receive packets from the transport layer (206). In one embodiment of the invention, the IP layer (202) is configured to perform IP level processing for both inbound and outbound packets.

Continuing with the discussion of FIG. 2, the inbound VSQ (204) is configured to receive packets from the IP layer (202). The inbound VSQ (204) corresponds to a queue data structure and is configured to queue packets received from the IP layer (202) prior to the packets being processed by the transport layer (206). In one embodiment of the invention, the inbound VSQ (204) may be used to control the number of packets being received by the packet destination (e.g., 132) associated with VNS. The inbound VSQ (204) may control the bandwidth by limiting the number of packets in the VSQ (204) and preventing additional packets from entering the VNS (200) until the inbound VSQ (204) has less than a threshold number of packets.

In one embodiment of the invention, the transport layer (206) is configured to process inbound and outbound packets in accordance with Transmission Control Protocol (TCP), User Datagram Protocol (UDP), or both UDP and TCP. Other protocols may be supported by the transport layer (206).

In one embodiment of the invention, the outbound VSQ (208) is a queue data structure configured to receive packets from the packet destination (e.g., 132) with which the VNS (204) is associated. Further, the outbound VSQ (208) is configured to store packets prior to sending the received packets to the transport layer (206). In one embodiment of the invention, the outbound VSQ (208) is also configured to control the flow of packets from the packet destination (e.g., 132) associated with the VNS (200) to the VNS (200). In one embodiment of the invention, the outbound VSQ (208) (or a related process) is configured to block an application from sending packets to the outbound VSQ (208), if the packet destination (e.g., 132) is attempting to issue packets at a higher rate than the outbound bandwidth allocated to the packet destination (e.g., 132). Further, the outbound VSQ (208) (or a related process) is configured to notify the packet destination (e.g., 132) when it is no longer blocked from issuing packets to the VNS (200).

In one embodiment of the invention, the inbound VSQ (204) and outbound VSQ (208) are each configured to enforce the manner in which packets are processed. Specifically, the inbound VSQ (204) and outbound VSQ (208) may be configured to enforce the packet processing requirements imposed by the transport layer (206). For example, TCP requires serial processing of packets. Thus, the inbound VSQ (204) and outbound VSQ (208) may require all threads accessing the inbound VSQ (204) and outbound VSQ (208) to conform to a mutual exclusion policy. In one embodiment of the invention, the mutual exclusion policy requires that only one thread may access the VSQ (inbound or outbound) at a time. Thus, if two threads are attempting to access a given VSQ (inbound or outbound), one thread must wait until the other thread has finished accessing the VSQ (inbound or outbound).

Alternatively, if the transport layer (206) only supports UDP, then the inbound VSQ (204) and outbound VSQ (208) may be configured to allow concurrent access. Said another way, two or more threads may concurrently access the VSQ (inbound or outbound). In one embodiment of the invention, if the transport layer (206) is configured to process both TCP and UDP packets, then the inbound VSQ (204) and outbound VSQ (208) are configured to conform to the more stringent standard (e.g., TCP if the transport layer supports both TCP and UDP).

In one embodiment of the invention, the inbound VSQ (204) and the outbound VSQ (208) are implemented as a single bi-directional VSQ. In such cases, the bi-directional VSQ includes a single set of configuration parameters (discussed above) to enforce the manner in which packets are processed. Further, the enforcement of the configuration parameters is performed on a VSQ-basis (as opposed to a per-direction basis). For example, if the bi-directional VSQ enforces a mutual exclusion policy, then only one thread may access the bi-directional VSQ at a time.

Figure 3:
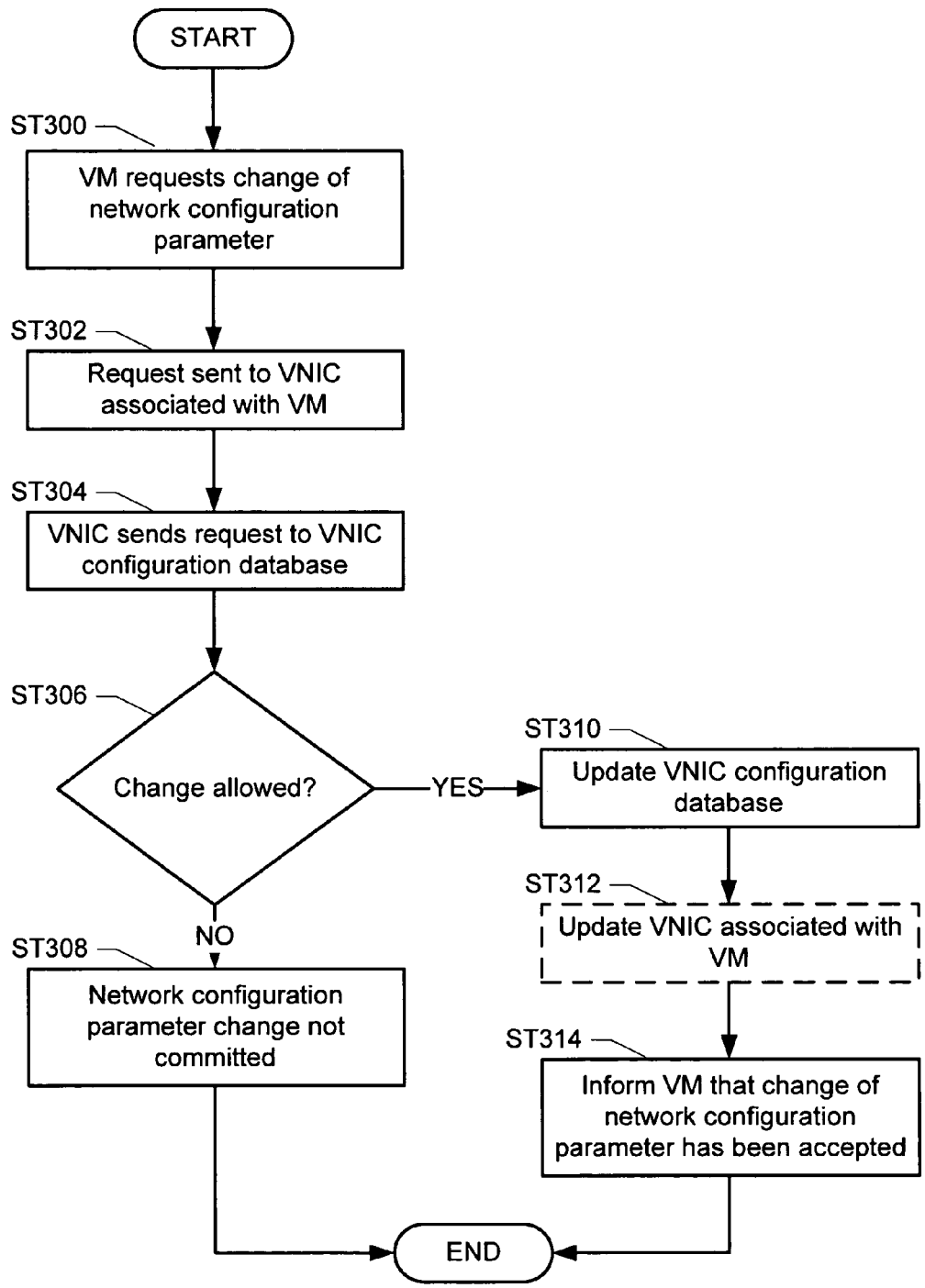
FIGS. 3-5 shows flowcharts in accordance with one or more embodiments of the invention.

FIG. 3 shows a flowchart in accordance with one or more embodiments of the invention. More specifically, FIG. 3 shows a flowchart for processing a request by a virtual machine to change a network configuration parameter. Initially, a VM requests a change of a network configuration parameter (ST300). In one embodiment of the invention, the request may include the network configuration parameter that the VM is attempting to change as well as the new value of the network configuration parameter. For example, the request may specify that the IP address for the VM should be changed to 10.1.5.1. The request is subsequently sent to the VNIC associated with the VM (ST302). For example, if VM 1 (146) issued a request to change a network configuration parameter, the request is sent to VNIC 2 (118). Returning to FIG. 3, the VNIC, upon receiving the request, sends the request to the VNIC configuration database (ST304).

The VNIC configuration database (104) then determines whether the VM is allowed to change the network configuration parameter as requested (ST306). For example, example if VM 1 (146) requested to change its MAC address, then the VNIC configuration database determines whether VM 1 (146) is allowed to change its MAC address based on the information included in the VNIC configuration database. If the change is not allowed, then the network configuration parameter change is not committed to the VNIC configuration database (ST308) and the process ends.

Alternatively, if the network configuration parameter change is allowed (i.e., the VM is allowed to change the network configuration parameter and, optionally, the VM is allowed to change the network configuration parameter to the value specified in the request), then the VNIC configuration database is updated to reflect the change in the network configuration parameter (ST310). Optionally, the VNIC associated with the VM is subsequently updated (ST312). ST312 is optional as the network configuration parameter that is changed may not affect the VNIC. For example, if the IP address is changed, then the VNIC is updated to include the new IP address. However, if the IP routing algorithm was changed, then the VNIC is not affected and, thus, is not changed.

The VM is subsequently informed, via a request sent by the VNIC configuration database to the associated VNIC, that the network configuration parameter has been changed (ST314). Though not shown in FIG. 3, upon receiving the notification of the acceptance of the change in network configuration parameter, the associated PDriver and/or other portions of the VM network stack (140, 142, 144) may also be updated to reflect the change in network configuration parameter.

Figure 4:
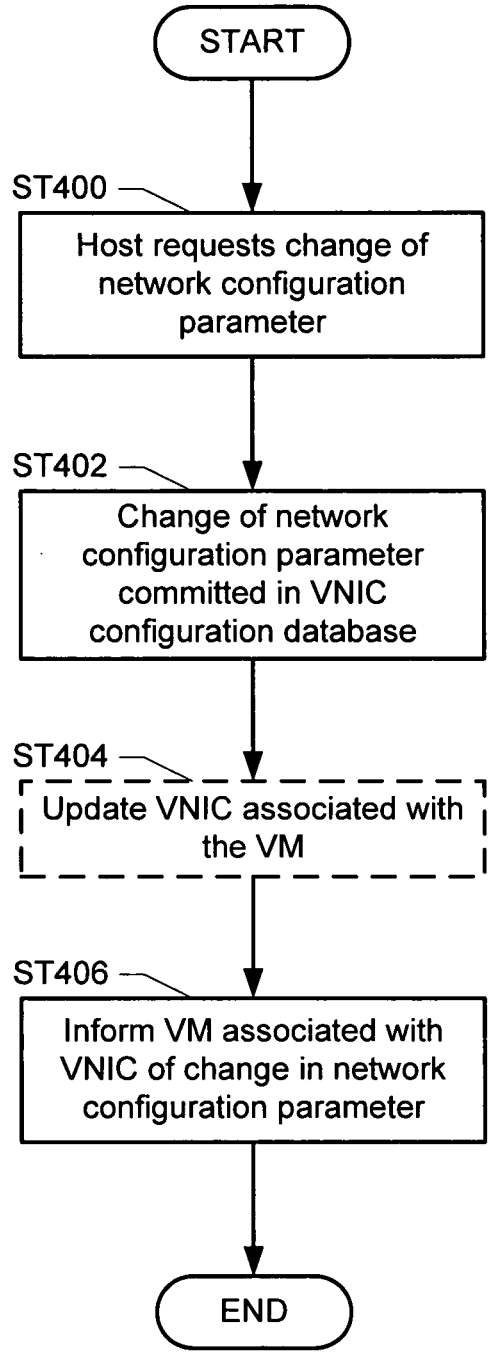

FIG. 4 shows a flowchart in accordance with one or more embodiments of the invention. More specifically, FIG. 4 shows a flowchart for processing a network configuration parameter initiated by a host. Initially, the host requests a change in a network configuration parameter, where the network configuration parameter is associated with a VM executing on the host (ST400). The change in the network configuration parameter is subsequently committed to the VNIC configuration database (ST402) (i.e., the entry associated with the VM is updated to reflect the change in network configuration parameter).

Optionally, the VNIC associated with the VM is subsequently updated (ST404). ST404 is optional as the network configuration parameter that is changed may not affect the VNIC. For example, if the IP address is changed, then the VNIC is updated to include the new IP address. However, if the IP routing algorithm was changed, then the VNIC is not affected and, thus, is not changed.

The VM is subsequently informed, via a request sent by the VNIC configuration database to the associated VNIC, that the network configuration parameter has been changed (ST406). Though not shown in FIG. 4, upon receiving the notification the change in network configuration parameter, the associated PDrvier and/or other portions of the VM network stack (140, 142, 144) may also be updated to reflect the change in network configuration parameter.

Figure 5:
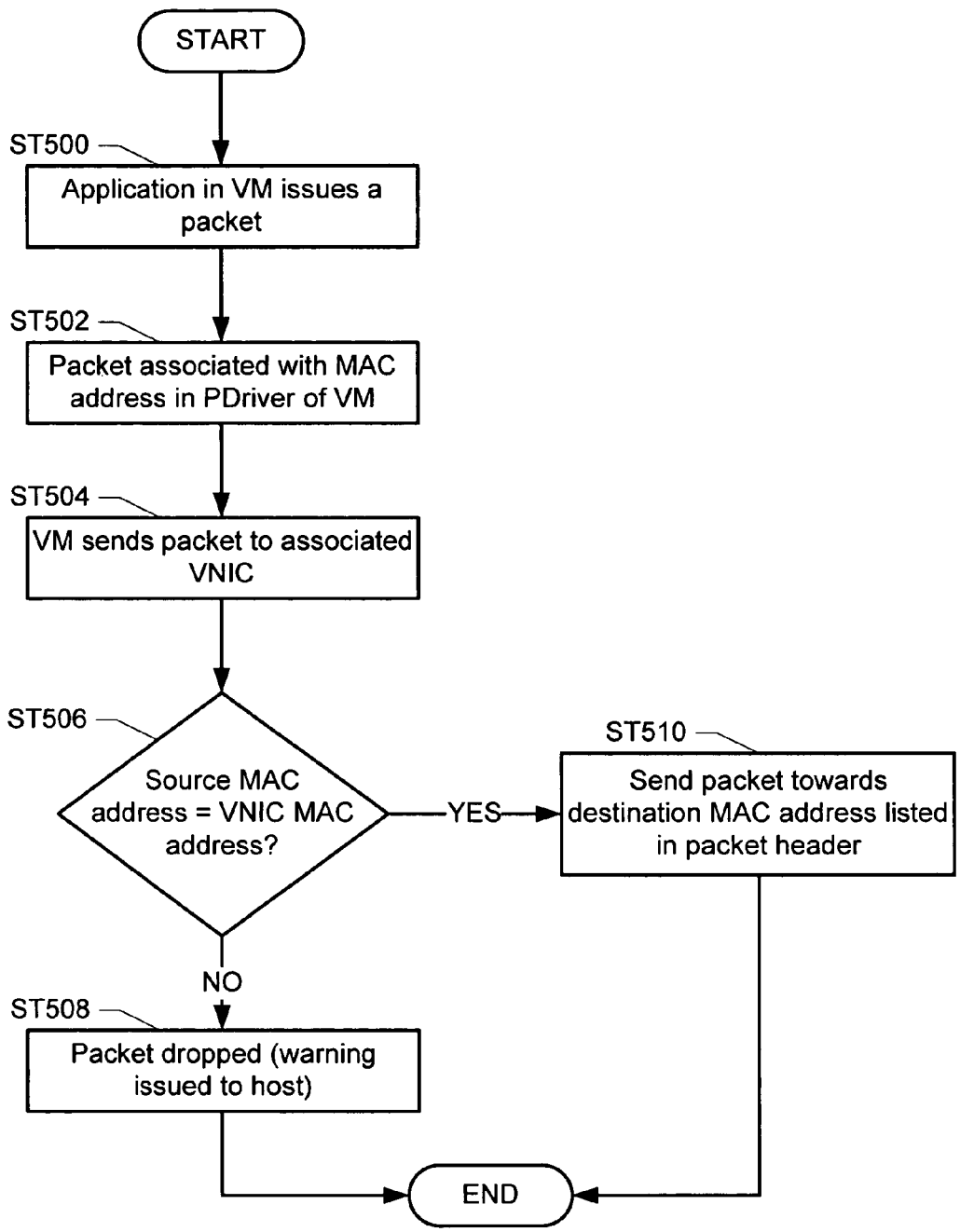

FIG. 5 shows a flowchart in accordance with one embodiments of the invention. More specifically, FIG. 5 shows a method for enforcing restrictions on changing various network configuration parameters by a virtual machine. Initially, an application in a VM (or the VM itself) issues a packet (ST500). The packet is subsequently associated with, among other information, the MAC address listed in the PDriver of the VM (ST502).

The VM subsequently sends the packet to the associated VNIC (ST504). Typically, the packet is received by the associated VNIC via an interface associated with the VM. The VNIC then determines whether the source MAC address (i.e., the MAC address associated with the VM) in the header of the packet is the same as the MAC address in the VNIC (i.e., the VNIC MAC address) (ST506). If the source MAC address is not the same as the MAC address in the VNIC, then the packet is dropped and, optionally, a warning is issued to the host that the VM is attempting to send spoofed packets (ST508). Alternatively, if the source MAC address is the same as the MAC address in the VNIC, then the packet is sent towards the destination MAC address listed in the header of the packet (ST510).

Figure 6:
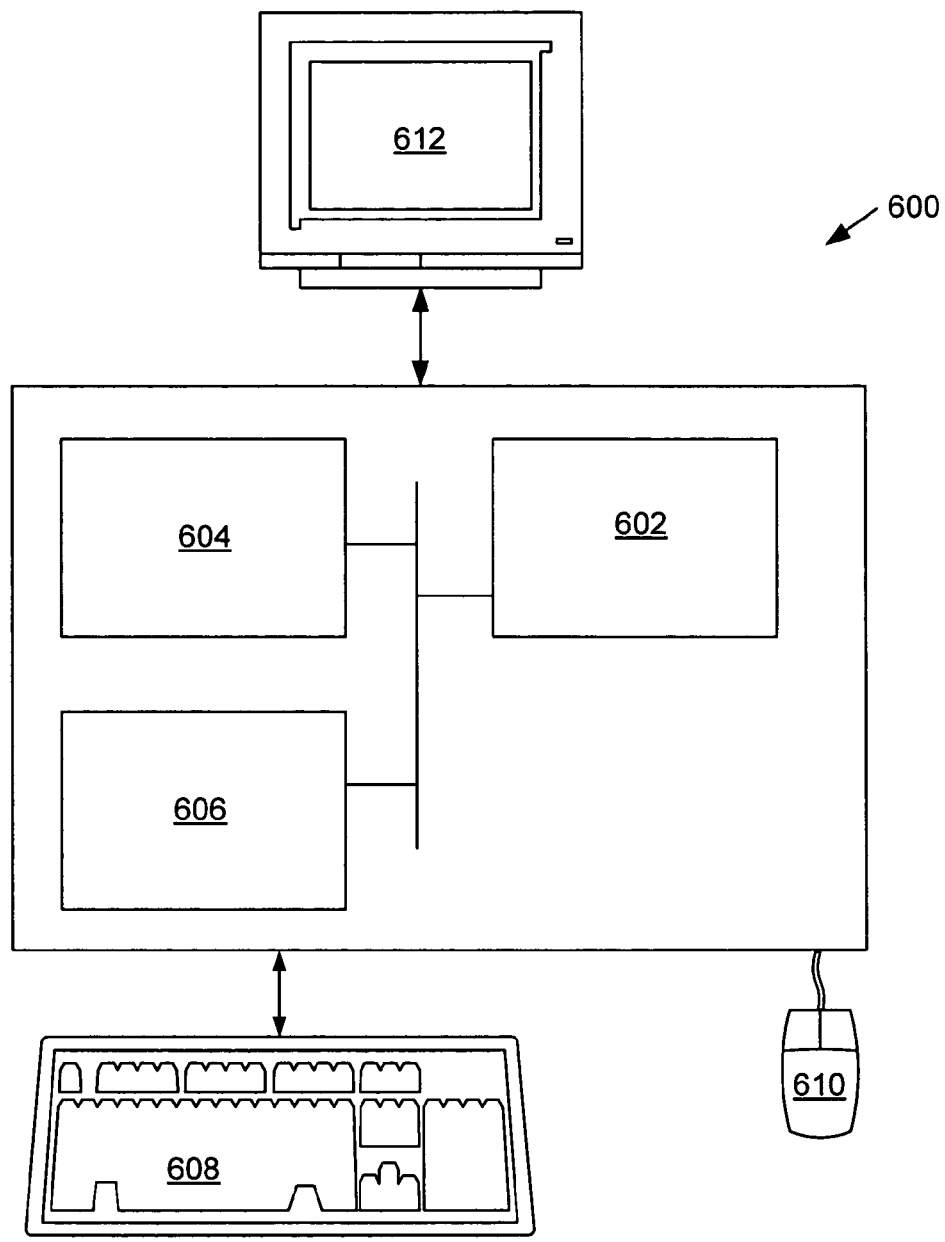
FIG. 6 shows a computer system in accordance with one embodiments of the invention.

An embodiment of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network via a network interface connection (not shown). Those skilled in the art will appreciate that these input and output means may take other forms. Further, those skilled in the art will appreciate that one or more elements of the aforementioned computer (600) may be remotely located and connected to the other elements over a network. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for changing network configuration parameters, comprising:
generating a first request to change a first network configuration parameter by a first virtual machine executing on a host, wherein the first request comprises a first new value for the first network configuration parameter;
sending the first request to a first virtual network interface card (VNIC) configuration database located on the host,
wherein the VNIC configuration database is associated with a first VNIC and a second VNIC,
wherein the first VNIC is associated with the first virtual machine and is configured to send and receive network traffic associated with the first VNIC, and
wherein the first VNIC is executing on the host and is not executing within the first virtual machine;
updating the VNIC configuration database and the first VNIC to reflect the first new value for the first network configuration parameter;
notifying the first virtual machine that the network configuration parameter has changed to the first new value for the first network configuration parameter;
generating a second request to change a second network configuration parameter by a second virtual machine executing on the host, wherein the second request comprises a second new value for the second network configuration parameter;
sending the second request to the VNIC configuration database,
wherein the second VNIC is associated with the second virtual machine and is configured to send and receive network traffic associated with the second VNIC, and
wherein the second VNIC is executing on the host and is not executing within the second virtual machine;
updating the VNIC configuration database and the second VNIC to reflect the second new value for the second network configuration parameter; and
notifying the second virtual machine that the second network configuration parameter has changed to the second new value for the second network configuration parameter.

2. The method of claim 1, further comprising:
updating a pseudo-driver in the first virtual machine to reflect the first new value for the first network configuration parameter, in response to notifying the first virtual machine.

3. The method of claim 1, wherein the first network configuration parameter is at least one selected from a group consisting of a Media Access Control (MAC) address and an internet protocol (IP) address.

4. The method of claim 1, wherein the VNIC configuration database is located on the host and managed by a host operating system and comprises at least one from a group consisting of a listing of network configuration parameters the first virtual machine is allowed to change and a listing of network configuration parameters associated with the first virtual machine.

5. The method of claim 1,
wherein generating the first request to change the first network configuration parameter comprises sending the first request to the first VNIC associated with the first virtual machine; and
wherein sending the first request to the VNIC configuration database comprises determining that the first virtual machine is allowed to change the first network configuration parameter.

6. A non-transitory computer readable medium comprising software instructions for changing network configuration parameters, wherein the software instructions, when executed, perform a method, the method comprising:
generating a first request to change a first network configuration parameter by a first virtual machine, wherein the first virtual machine is executing on a host, wherein the first request comprises a first new value for the first network configuration parameter;
sending the first request to a virtual network interface card (VNIC) configuration database executing on the host,
wherein the VNIC configuration database is associated with a first VNIC and a second VNIC,
wherein the first VNIC is associated with the first virtual machine and is configured to send and receive network traffic associated with the first VNIC, and
wherein the first VNIC is executing on the host and is not executing within the first virtual machine;
updating the VNIC configuration database and the first VNIC to reflect the first new value for the first network configuration parameter;
notifying the first virtual machine that the network configuration parameter has changed to the first new value for the network configuration parameter;
generating a second request to change a second network configuration parameter by a second virtual machine executing on the host, wherein the second request comprises a second new value for the second network configuration parameter;
sending the second request to the VNIC configuration database,
wherein the second VNIC is associated with the second virtual machine and is configured to send and receive network traffic associated with the second VNIC, and
wherein the second VNIC is executing on the host and is not executing within the second virtual machine;
updating the VNIC configuration database and the second VNIC to reflect the second new value for the second network configuration parameter; and
notifying the second virtual machine that the second network configuration parameter has changed to the second new value for the second network configuration parameter.

7. The computer readable medium of claim 6, further comprising:
updating a pseudo-driver in the first virtual machine to reflect the first new value for the first network configuration, in response to the notifying the first virtual machine.

8. The computer readable medium of claim 6, wherein the first network configuration parameter is at least one selected from a group consisting of a Media Access Control (MAC) address and an internet protocol (IP) address.

9. The computer readable medium of claim 6, wherein the VNIC configuration database is located on the host and managed by a host operating system and comprises at least one from a group consisting of a listing of network configuration parameters the first virtual machine is allowed to change and a listing of network configuration parameters associated with the first virtual machine.

10. The computer readable medium of claim 6,
wherein generating the first request to change the first network configuration parameter comprises sending the first request to the first VNIC associated with the first virtual machine;
wherein sending the first request to the VNIC configuration database comprises determining that the first virtual machine is allowed to change the first network configuration parameter.

11. A host, comprising:
a processor;
a first virtual machine, executing on the processor, configured to:
generate a first request to change a first network configuration parameter associated with the first virtual machine, wherein the first request comprises a first new value for the first network configuration parameter; and
send the first request to a first virtual network interface card (VNIC), wherein the first VNIC is not executing within the first virtual machine;
the first VNIC, operatively connected to the first virtual machine, configured to:
receive the first request from the first virtual machine; and
send the first request to a VNIC configuration database, wherein the first VNIC comprises functionality to send and receive network traffic;
a second virtual machine, executing on the processor, configured to:
generate a second request to change a second network configuration parameter associated with the second virtual machine, wherein the second request comprises a second new value for the second network configuration parameter; and
send the second request to a second VNIC, wherein the second VNIC is not executing within the second virtual machine;
the second VNIC, operatively connected to the second virtual machine, configured to:
receive the second request from the second virtual machine; and
send the second request to the VNIC configuration database,
wherein the second VNIC comprises functionality to send and receive network traffic;
the VNIC configuration database, operatively connected to the first VNIC and the second VNIC, configured to:
receive the first request and the second request;
determine, using the first request, whether the first virtual machine is allowed to change the first network configuration parameter;

if the first virtual machine is allowed to change the first network configuration parameter:
  update the VNIC configuration database and first VNIC to reflect the first new value for the first network configuration parameter, and
  notify the first virtual machine that the requested change in the first network configuration parameter to the first new value for the first network configuration parameter is allowed; and
if the first virtual machine is not allowed to change the first network configuration parameter:
  drop the first request;
determine, using the second request, whether the second virtual machine is allowed to change the second network configuration parameter;
if the second virtual machine is allowed to change the second network configuration parameter:
  update the VNIC configuration database and second VNIC to reflect the second new value for the second network configuration parameter, and
  notify the second virtual machine that the requested change in the second network configuration parameter to the second new value for the second network configuration parameter is allowed; and
if the second virtual machine is not allowed to change the second network configuration parameter:
  drop the second request.

12. The host of claim 11, wherein the host is configured to:
generate a third request to change a third network configuration parameter by the first virtual machine, wherein the third request comprises a third new value for the third network configuration parameter;
send the third request to the VNIC configuration database associated with the first VNIC; and
wherein the VNIC configuration database, in response to receiving the third request, is further configured to:
  update the VNIC configuration database and first VNIC to reflect the third new value for the third network configuration parameter, and
  notify the first virtual machine that the third network configuration parameter has changed to the third new value for the third network configuration parameter.

13. The host of claim 11, wherein the first VNIC is configured to:
receive a packet issued by the first virtual machine;
determine whether a source media access control (MAC) address in a header of the packet is the same as a MAC address associated with the first VNIC;
if the sender MAC address in the header of the packet is the same as the MAC address associated with the first VNIC:
  send the packet toward a target using a destination MAC address in the header of the packet;
if the sender MAC address in the header of the packet is not the same as the MAC address associated with the first VNIC:
  drop the packet.

14. The host of claim 13, wherein the source MAC address is obtained from a pseudo-driver in the first virtual machine.

15. The host of claim 11, wherein the first virtual machine is further configured to update a pseudo-driver to reflect the first new value for the first network configuration parameter, in response to receiving notification that the change in the first network configuration parameter is allowed.

16. The host of claim 11, wherein the first network configuration parameter is at least one selected from the group consisting of a Media Access Control (MAC) address and an internet protocol (IP) address.

17. The host of claim 11, wherein the VNIC configuration database comprises a listing of network configuration parameters associated with the first virtual machine.

18. The host of claim 11, wherein the VNIC configuration database is managed by a host operating system executing on the host.

19. The host of claim 11, wherein the VNIC configuration database comprises a listing of network configuration parameters the first virtual machine is allowed to change.

* * * * *